United States Patent Office 3,331,678
Patented July 18, 1967

3,331,678
COMPOSITION AND METHOD FOR STIMULATING SEED GERMINATION AND PLANT GROWTHS
Cecil C. Chappelow, Jr., 7111 Summit, Kansas City, Mo. 64114, and Thomas J. Byerley, 5100 Maple, Shawnee Mission, Kans. 66202
No Drawing. Filed May 9, 1966, Ser. No. 548,379
20 Claims. (Cl. 71—77)

This application is a continuation-in-part of our copending application, Ser. No. 284,841, filed June 3, 1963, and now abandoned.

This invention relates to new organic triaryl dideoxy hexitols and to compositions for and methods of stimulating seed germination, root and plant growth.

It has heretofore been proposed to treat seeds with hormones to increase the percentage of germination and to have a systemic effect on the new plant; that is, to influence growth and yield of the plant. While there have been isolated instances of the efficacy of hormones for this purpose, hormones have been found to be much more effective in the destruction of seeds, particularly for the destruction of weed seeds and weeds, than for stimulating the germination of the seeds or the growth of the plants. Certain chemical compounds (other than hormones) are, however, alleged to have plant growth promoting properties. Patent No. 2,842,051, dated July 8, 1959, for instance, discloses mixtures having plant growth promoting properties that include gibberellic acid, or an active derivative thereof, and a diluent. The diluent, so that patent states, may be liquid or solid or may consist of or contain plant nutrients, particularly sources of nitrogen.

We have now discovered that triaryl dideoxy hexitols have a stimulating effect upon the germination of seeds and upon the growth of roots and plants. Some of these compounds can be made in accordance with methods disclosed in the Linn Patent No. 2,798,100, dated July 2, 1957, for the making of compounds that are therein termed diaryldesoxy ketitols and are herein more accurately termed triaryl dideoxy ketitols. This class of compounds can be produced by reacting a ketose sugar with an aromatic compound, using hydrogen fluoride as a catalyst.

We have further discovered that mixed triaryl dideoxy ketitols wherein at least one aryl differs from the other aryl radicals and mixed cycloalkyl aryl dideoxy ketitols wherein one or two of the aryls have been selectively hydrogenated also have a seed stimulating and plant growth stimulating activity.

Examples of ketose sugares useful herein are the monosaccharides containing a ketone group such as fructose, sorbose and various isomeric forms thereof. Among the simpler aromatic hydrocarbons are benzene, toluene, o-xylene, m-xylene, p-xylene, ethyl benzene and 1,2,3-trimethyl benzene. The condensation products are generically referred to as triaryl dideoxy ketitols of which 1,1,2-tris (4-methylphenyl)-1,2-dideoxy hexitol is a species. While some of the compounds prepared by the Linn method are old, a more accurate structure only being restated, others as further described and claimed below, are new.

We have also found quite unexpectedly that the triaryl dideoxy compounds have unusual utility for stimulating plant seed germination and plant growth. We have further found that these compounds may be employed both in discrete particle form as dusts, and also in aqueous-type dispersions, or in the form of wettable powders containing a dispersant for dispersing the relatively water-insoluble active compound into colloidal solution or suspension. Preparations containing the active compound can be used both in the water culture of plants, referred to as hydroponics, and in the surface soil culture of plants. A large number of different types of plants have been found to be benefited by the application of the active compounds to the seeds, roots, or plants themselves.

It is therefore an important object of this invention to provide a novel method of stimulating the germination of plant seeds and the growth of roots and plants, and to provide new compounds and new compositions suitable for application to the seeds, roots or plants, in order to realize the stimulating growth properties of the active compound.

Other and further important objects of this invention will become apparent from the following description and appended claims.

The various active compounds to which this invention is directed may be generically termed the condensation products of monosaccharides having a ketone group and benzene hydrocarbons, including the alkyl-, hydroxy- and alkylhydroxy benzenes, mixed alkyl hydrocarbons of benzene and cyclo-alkyl benzene hydrocarbons.

The following generic formula defines compounds having useful stimulating effects upon seed germination and upon the growth of roots and plants:

I
$$\begin{array}{c}\text{Ar}-\text{CH}-\text{Ar}'\\ |\\ \text{CH}-\text{Ar}''\\ |\\ \text{CH}-\text{X}\\ |\\ \text{CH}-\text{X}\\ |\\ \text{CH}-\text{X}\\ |\\ \text{CH}_2-\text{X}\end{array}$$

wherein Ar is a phenyl, alkylphenyl, hydroxy phenyl or alkyl hydroxy phenyl radical; Ar' and Ar" are phenyl, alkylphenyl, hydroxy phenyl, alkyl hydroxy phenyl, cyclohexyl, alkyl cyclohexyl, hydroxy cyclohexyl or alkyl hydroxy cyclohexyl radicals; X is —OR, —OOCR, —OCOOR', —OCONR$_2$ and two X radicals may form a cyclic dioxy alkylidene ether of the formula

R is H, and alkyl or aryl radical having 1 to 10 carbon atoms; R' is an alkyl or aryl radical having 1 to 10 carbon atoms; and R" is an alkylidene or an alkylidene aryl radical having 1 to 10 carbon atoms.

In the above formula where Ar, Ar' and Ar" are different radicals or when X is carbonyl (—OCOOR), carbamoyl (OCONR$_2$) or alkylidene or alkylidene aryl

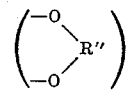

novel compounds are defined which may be given by the following subgeneric formula:

I
$$\begin{array}{c}\text{Ar}-\text{CH}-\text{Ar}'\\ |\\ \text{CH}-\text{Ar}''\\ |\\ \text{CH}-\text{X}\\ |\\ \text{CH}-\text{X}\\ |\\ \text{CH}-\text{X}\\ |\\ \text{CH}_2-\text{X}\end{array}$$

wherein Ar, Ar' and Ar" are the same as given above, at least one radical differing from another; one or more X radicals are —OCOOR, OCONR$_2$

or only some X radicals are partially substituted with —OR' groups and R, R' and R" are as given above.

Where Ar, Ar' and Ar" are the same and X is as defined in Formula I but not in Formula II above, the compounds can be made by the method of the Linn Patent 2,798,100.

In the following table are listed some specific condensation products and some derivatives thereof constituting various species coming under the above-given generic Formula I:

(1) The condensation product of D-fructose and toluene, M.P. 212–214° C., $[\alpha]_D^{25}+47.0°$ (c. 2, acetone); in which Ar is p-$CH_3C_6H_4$ and X is OH; viz, a 1,1,2-tris-(4-methylphenyl)-1,2-dideoxy hexitol.

(2) The acetylated condensation product of D-fructose and toluene, M.P. 157.5–158.5° C., $[\alpha]_D^{25}-1.3°$ (c. 2, acetone); in which Ar is p-$CH_3C_6H_4$ and X is —OOCR, and R' is $CH_3$; viz, a 1,1,2-tris(4-methylphenyl)-1,2-dideoxy-3,4,5,6-tetra-O-acetyl hexitol.

(3) The condensation product of D-fructose and o-xylene, M.P. 205–207° C., $[\alpha]_D^{25}+40.5°$ (c. 2, acetone); in which Ar is m-, p-$(CH_3)_2C_6H_3$ and X is OH; viz, a 1,1,2-tris(3,4-dimethylphenyl)-1,2-dideoxy hexitol.

(4) The condensation product of L-sorbose and toluene, M.P. 215.5–217° C., in which Ar is p-$CH_3C_6H_4$ and X is OH; viz, a 1,1,2-tris(4-methylphenyl)-1,2-dideoxy hexitol.

(5) The condensation product of L-sorbose and o-xylene, M.P. 212–214° C., $[\alpha]_D^{25}+15.9$ (c. 2, dimethylformamide); in which Ar is m-, p-$(CH_3)_2C_6H_3$ and X is OH; viz, a 1,1,2-tris(3,4-diethylphenyl)-1,2-dideoxy hexitol.

(6) The acetylated condsation product of D-fructose and o-xylene, M.P. 184–185.5° C., $[\alpha]_D^{25}+10.2°$ (c. 2, acetone); in which Ar is m-, p-$(CH_3)_2C_6H_3$ and X is OOCH and R is $CH_3$; viz, a 1,1,2-tris(3,4-dimethylphenyl)-1,2-dideoxy-3,4,5,6-tetra-O-acetyl hexitol.

(7) The methylated condensation product of D-fructose and toluene, B.P. 220–224° C./0.1 mm. Hg, $[\alpha]_D^{25}$ —64.9° (c. 2, acetone); in which Ar is p-$CH_3C_6H_4$ and X is —OR and R is $CH_3$; viz, a 1,1,2-tris(4-methylphenyl)-1,2-dideoxy-3,4,5,6-tetra-O-methyl hexitol.

*Preparation of mixed triaryl dideoxy ketitols*

(A) The mixed aryl ketitol is prepared by first forming a 2-monoaryl 2-deoxy pyranose, known compounds, where the 2-mono-aryl group is Ar" as defined above, which in about molar quantity is reacted with about 2 mols of a different aryl group Ar as defined above in the presence of a large excess of anhydrous hydrogen fluoride at low temperatures of about —50 to +10° C.

*Preparation of a carbamate derivative*

(B) Where X is a carbamoyl radical the triaryl dideoxy ketitol, X=OH, is reacted with an aryl isocyanate using pyridine as catalyst according to the following:

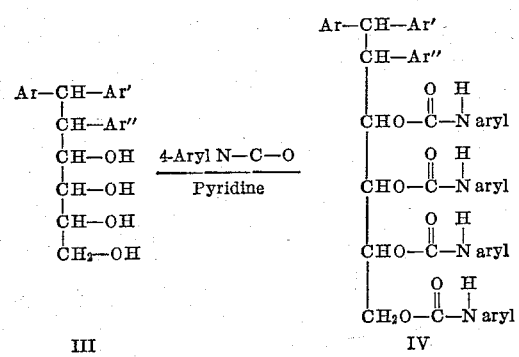

*Preparation of a carbonate derivative*

(C) Where X is a carbonate radical, the triaryl dideoxy ketitol condensate (III) is converted to the tris lithium alcoholate (V) form; then converted to tris alkoxy carbonyl (VI) with alkyl chloroformate which undergoes intromolecular cyclization (VII) or (VIII) as follows:

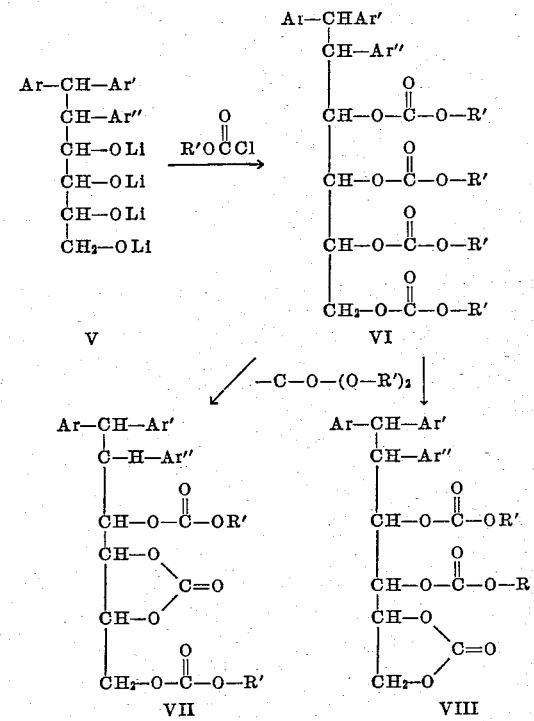

and Ar, Ar', Ar" and R' are defined in the generic Formula I above.

*Preparation of dioxy cyclic ether alkylidene or alkylidene phenyl*

(D) The two X groups combine to form a dioxy alkylidene or alkylidene phenyl group. The tri-aryl ketitol condensate III is further condensed with a hydrocarbon aldehyde of the formula R"CHO using zinc chloride as a catalyst in the following reaction:

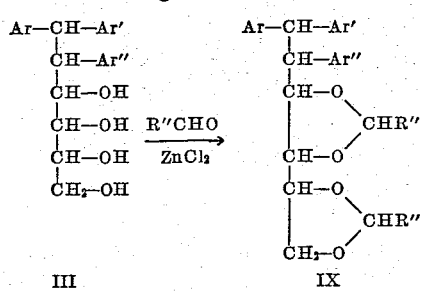

where R", Ar, Ar' and Ar" are as defined in I above.

*Preparation of a partial alkoxylated derivative*

(E) Where partial alkoxylation is desired, the tri-aryl dideoxy ketitol condensate (III) is treated with the desired dihydrocarbon sulfate ester according to the following reaction:

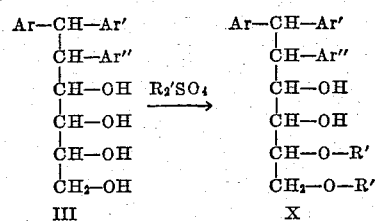

*Preparation of cycloalkyl aryl mixed compound*

(F) Where one or two of the aryls are desirably converted to cyclo alkyl, the triaryl dideoxy ketitol condensate or its selected X derivative is selectively hydrogenated with a hydrogenation catalyst such as Raney nickel or platinum to give the compound of the generic Formula I wherein one or two of Ar, Ar′ or Ar″ radicals is a cyclohexyl ring compound as defined in Formula I.

EXAMPLE 1

*Preparation of a homo tri aryl dideoxy hexitol*

A charge of 75 grams (0.42 mole) of L-sorbose and 250 milliliters (220 grams, 2.08 moles) of o-xylene was sealed in a one liter stainless steel Magne Dash autoclave. The autoclave was cooled to below zero, evacuated, and 373 grams of anhydrous hydrogen fluoride added. The mixture was allowed to react at 0° C. for 16 hours, after which time the excess HF was removed with a water aspirator for two hours. The autoclave was then opened and the contents diluted with anhydrous ether. The ethereal solution was washed with water until neutral, and dried over anhydrous $Na_2SO_4$. Addition of n-pentane to the ether solution caused the precipitation of 56 grams of crude product. After washing with n-pentane and cold benzene, the partially purified product was recrystallized once from methyl alcohol. One subsequent recrystallization from toluene yielded 30 grams of the final product, 1,1,2-tris(3,4-dimethylphenyl)-1,2-dideoxy hexitol, as a white crystalline powder, M.P. 213–214° C., $[\alpha]_D^{25}+13.6°$ (c. 2, DMF).

*Analysis.*—Calcd. for $C_{30}H_{38}O_4$: C, 77.89; H, 8.28. Found: C, 77.96; H, 8.04.

Following the procedure of Example 1, the condensation product of D-fructose and benzene is obtained with an M.P. of 205–208° C., $[\alpha]_D^{25}+54.36°$ (c. 2, DMF); in which Ar is $C_6H_5$ and X is OH; viz, 1,1,2-tri-phenyl-1,2-dideoxy hexitol.

Following the procedure of Example 1, the condensation product of D-fructose and ethylbenzene is obtained with an M.P. of 155–158° C.; in which Ar is p-$C_2H_5C_6H_5$ and X is OH; viz, 1,1,2-tris(4-ethylphenyl)-1,2-dideoxy hexitol.

EXAMPLE 2

*Mixed tri aryl dideoxy hexitol*

A charge of 48 grams (0.18 mole) of a 2-(3,4-dimethyl)-2-deoxy-D-fructopyranose, M.P. 136–138° C., and 350 grams of toluene were placed in a one liter round-bottom flask, equipped with a stirrer, thermometer, Dean Stark trap and condenser. The mixture was heated to reflux and a small trace of moisture removed. The toluene slurry was transferred to a one liter stainless steel Magne Dash autoclave, sealed, cooled to −30° C., evacuated and 350 grams (17.9 moles) of anhydrous hydrogen fluoride added. The mixture was then reacted at −1° C. for three hours. The excess hydrogen fluoride was removed with a water pump for two hours, after which the autoclave was opened, diluted with ether and transferred to a separatory funnel. The ethereal solution was washed with water until neutral and evaporated to dryness in a hood draft. The residue was washed several times with ether and filtered to yield 18.8 grams of crude product. This was recrystallized four times from boiling benzene to yield 9.0 grams of the final product, a 1,1-bis(4-methylphenyl)-2-(3,4-dimethylphenyl)-1,2-dideoxy hexitol, as a white crystalline solid, M.P. 186–188° C.

*Analysis.*—Calcd. for $C_{28}H_{34}O_4$: C, 77.39; H, 7.89. Found: C, 77.33; H, 8.21.

EXAMPLE 3

*Cyclo alkyl diaryl dideoxy hexitol*

Twenty grams (0.048 mole) of the D-fructose-derived 1,1,2-tris(4-methylphenyl)-1,2-dideoxy hexitol, 100 milliliters of cyclohexane and 10 grams of an activated nickel hydrogenation catalyst were placed in a one liter steel autoclave and pressurized to 835 p.s.i.g. with hydrogen. The contents of the autoclave were stirred at 25° C. for three hours and then the temperature was increased to 125° C. and stirring continued for seventeen hours. The autoclave was depressurized, opened and the product dissolved in benzene. After filtration to remove the catalyst, the filtrate was evaporated to dryness yielding 15.5 grams of crude product. After a series of successive recrystallizations from acetone-water, isopropyl alcohol, cyclohexane and finally toluene, 2.0 grams of the final product, a 1,2-bis(4-methylphenyl)-1-(4-methylcyclohexyl)-1,2-dideoxy hexitol, was obtained as a white crystalline powder, M.P. 230–233° C.

*Analysis.*—Calcd. for $C_{27}H_{38}O_4$: C, 76.02; H, 8.98. Found: C, 75.91; H, 9.16.

EXAMPLE 4

*Tri aryl dideoxy hexitol acetate*

To 10 grams of the 1,1,-bis(4-ethylphenyl)-2-(3,4-dimethylphenyl)-1,2-dideoxy hexitol which was obtained by the hydrogen fluoride-catalyzed condensation of a 2-(3,4-dimethylphenyl)-D-fructopyranose and ethylbenzene, was added 100 grams of acetic anhydride and several drops of concentrated $H_2SO_4$. The mixture was heated on a steam bath for two hours, cooled to room temperature and poured over ice. The water was extracted with ether and the ethereal solution washed with aqueous $K_2CO_3$ solution until neutral. The ethereal solution was then dried over anhydrous $Na_2SO_4$, filtered and decolorized with charcoal. The ether was removed on a flash evaporator to yield a viscous dark oil, which solidified on cooling to a crystalline solid. Two recrystallizations from cyclohexane yielded 5 grams of the final product, a 1,1-bis(4-ethylphenyl)-2-(3,4-dimethylphenyl)-1,2-dideoxy-3,4,5,6-tetra-O-acetyl hexitol, as a white crystalline powder, M.P. 161–164° C.

*Analysis.*—Calcd. for $C_{38}H_{46}O_8$: C, 72.36; H, 7.35. Found: C, 72.09; H, 7.11.

EXAMPLE 5

*Tri aryl dideoxy hexitol cyclic alkylidene diether*

Twenty grams (0.058 mole) of the 1,1,2-tris(3,4-dimethylphenyl)-1,2-dideoxy hexitol which was obtained by the hydrogen fluoride-catalyzed condensation of D-fructose and o-xylene was dissolved in 200 ml. of dry reagent-grade acetone and placed in a 500 mililiter three-necked flask. Eight milliliters of concentrated $H_2SO_4$ was added, the flask being agitated gently to effect complete solution. The mixture was then stirred vigorously for five hours at room temperature. The reaction mixture was neutralized with aqueous potassium carbonate and concentrated to a heavy syrup on a rotary film evaporator. The syrupy residue was diluted with water and the aqueous solution extracted with benzene. The benzene extracts were dried with anhydrous $Na_2SO_4$, decolorized by treatment with charcoal and evaporated to dryness. Three recrystallizations from absolute ethanol yielded 10 grams of the final product, 1,1,2-tris(3,4-dimethylphenyl)-1,2-dideoxy-3,4:5,6-di-O-isopropylidene hexitol, as white crystals, M.P. 136.0–137.5° C.

*Analysis.*—Calcd. for $C_{36}H_{46}O_4$: C, 79.67; H, 8.54. Found: C, 79.75; H, 8.48.

EXAMPLE 6

*Tri aryl dideoxy dibenzylidine hexitol*

The reactants consisted of 25 grams (0.08 mole) of the D-fructose-derived 1,1,2-tris(4-methylphenyl)-1,2-dideoxy hexitol, 13.6 grams (0.10 mole) of zinc chloride and 105 grams (0.9 mole) of benzaldehyde. These starting materials were shaken on a Burrell shaker at 25° C. for twenty four hours in a one liter filter flask. The reaction mixture was worked up by pouring the slurry into 350 milliliters of cold water, and extracting the water phase several times with Skellysolve F. The extracts were evaporated to dryness and some of the excess benzaldehyde was removed under vacuum at 90° C. The residue was taken up in 95 percent ethanol and decolorized with Norit A. The alcohol filtrate gave 7.2 grams of white crystals, M.P. 155–163° C. The impure product was again decolorized from an 80 percent isopropyl alcohol—20 percent acetone solvent pair—and the filtrate yielded 4.0 grams, M.P. 181–187° C. This material was washed several times on the filter with Skellysolve F to obtain 3.7 grams, M.P. 184–187° C. of the final product, 1,1,2-tris(4-methylphenyl)-1,2-dideoxy-3,4:5,6-di-O-benzylidene hexitol, as a white feathery solid.

Analysis.—Calcd. for $C_{41}H_{40}O_4$: C, 82.52; H, 6.76. Found: C, 82.72; H, 6.51.

EXAMPLE 7

Tri aryl dideoxy hexitol tetra methyl ether

The D-fructose-derived 1,1,2-tris(3,4-dimethylphenyl)-1,2-dideoxy hexitol, 17 grams (0.05 mole) was dissolved in 500 milliliters of hot toluene and 11.5 grams (0.18 mole) of n-butyl-lithium in 115 milliliters of hexane was added. After a slight exothermic reaction during addition, the mixture was cooled to room temperature and 25.2 grams (0.2 mole) of dimethyl sulfate was added. After the addition, which caused a slight exothermic reaction, the mixture was heated to reflux and then held at 90° C. over night. The volume of the reaction mixture was then reduced and sufficient base added to destroy the excess dimethyl sulfate. The mixture was heated to 60° C. for one hour, cooled, diluted with water and extracted with ether. The ethereal solution was washed with water until neutral, dried over anhydrous sodium sulfate, decolorized with Norit A and the ether removed on a flash evaporator. Infrared spectrum of the crude compound, a syrup, contained no hydroxyl bands. This crude product was dissolved in hot absolute methanol, cooled and 6 grams of crystalline precipitate filtered off. The final product, 1,1,2-tris(3,4 - dimethylphenyl) - 1,2 - dideoxy - 3,4,5,6 - tetra-O-methyl hexitol, was a white crystalline solid, M.P. 93.5–95.5° C., $[\alpha]_D^{25}=-53.1°$ (c. 2, acetone).

Analysis.—Calcd. for $C_{34}H_{46}O_4$: C, 78.72; H, 8.94; $OCH_3$, 23.93. Found: C, 78.52; H, 8.88; $OCH_3$, 23.60.

EXAMPLE 8

Tri aryl dideoxy hexitol carbamate

Ten grams (0.03 mole) of the D-fructose-derived 1,1,2-tris(3,4-dimethylphenyl)-1,2-dideoxy hexitol (M.P. 206.5–208.5° C.), 20 milliliters (22 grams, 0.185 mole) of phenyl isocyanate, and approximately 3 milliliters of pyridine were placed in a 200 milliliter flask and heated on the steam bath for forty five minutes. The viscous, oily reaction mixture was then diluted with 250 milliliters of benzene and washed with cold water. The benzene layer was separated and dried over anhydrous $Na_2SO_4$ overnight. The benzene solution was evaporated to dryness, and the residue was taken up in hot cyclohexane. All of the material did not dissolve and the cyclohexane extract was filtered hot. Two and two-tenths grams (M.P. 239–252° C.) removed on the filter while 13.8 grams (M.P. 144–160° C.) came out on the cyclohexane filtrate. The latter fraction was again heated and stirred with about 700 milliliters of boiling cyclohexane and filtered hot. The filtrate consisted of 8.9 grams (M.P. 167–170° C.). Repeated extractions with cyclohexane yielded 5.0 grams of the final product, 1,1,2-tris(3,4-dimethylphenyl)-1,2-dideoxy-3,4,5,6-tetra-O-(phenylcarbamoyl) hexitol, as a white amorphous powder, M.P. 169.5–171.5° C., $[\alpha]_D^{25}$ +122.4° (c. 2, acetone).

Analysis.—Calcd. for $C_{58}H_{58}N_4O_8$: C, 74.17; H, 6.23; N, 5.97. Found: C, 74.12; H, 6.18; N, 6.29.

EXAMPLE 9

Tri aryl dideoxy hexitol partial ether

Fourty-four grams (0.1 mole) of the D-fructose-derived 1,1,2 - tris(4-methylphenyl)-1,2-dideoxy - 3,4,5,6-tetra-O-acetyl hexitol was dissolved in 600 milliliters of acetone in a two-liter, three-necked flask. The stirred solution was heated to 55° C. and a total of 84 milliliters, 0.9 mole) of dimethylsulfate and 225 milliliters of 30 percent NaOH was added in 10 equal increments at 10 minute intervals. After the 10th increment had been added, 100 milliliters of water was added, the temperature was raised to 60° C., and 775 milliliters of solvent were removed. The reaction mixture was poured into a large volume of water and again filtered, washed with hot water, and taken up in 500 milliliters of diethyl ether. The ether solution was washed several times with water to remove the residual base, decolorized with Norit A, filtered and evaporated to dryness. The crude product amounted to 33 grams of material (M.P. 119–124° C.). Repeated recrystallizations from cyclohexane yielded 15 grams of the final product, 1,1,2-tris(4-methylphenyl)-1,2-dideoxy-5,6-di-O-methyl hexitol, as a white granular solid, M.P. 136.5–137.5° C., $[\alpha]_D^{25}+25.07°$ (c. 2, acetone).

Analysis.—Calcd. for $C_{29}H_{36}O_4$: C, 77.65; H, 8.09; $OCH_3$, 13.84. Found: C, 77.52; H, 8.06; $OCH_3$, 14.24.

EXAMPLE 10

Tri aryl dideoxy hexitol carbonate

To 40 grams (0.128 mole) of the D-fructose-derived 1,1,2-tris(4-methylphenyl)-1,2-dideoxy hexitol in 500 milliliters of hot toluene was added 134 milliliters of a 20-percent heptane solution of n-butyllithium (26.8 grams, 0.42 mole). Gas was evolved during the addition and as the mixture was heated to reflux. After all of the n-heptane was removed and degassing had ceased, the reaction mixture was cooled and added dropwise to a reaction vessel containing 100 milliliters of toluene and 54.3 grams (0.5 mole) of ethyl chloroformate. After the mildly exothermic reaction had subsided, an additional 10 milliliters (approximately 0.1 mole) of ethyl chloroformate was added, and the mixture heated to 90° C. for an hour and a half. The mixture was cooled, and washed with sodium bicarbonate solution and then with water until it was neutral. After removal of the entrained water by azeotropic distillation, the resultant clear toluene solution was cooled overnight. The white solid which formed was filtered off and discarded. The filtrate was evaporated to dryness yielding 59 grams of crude product which was recrystallized from absolute ethanol. The white solid that crystallized out was filtered and dried in a vacuum oven, to yield 35.5 grams of the final product, 1,1,2-tris(4-methylphenyl) - 1,2-dideoxy-3,4-bis-O-(ethoxycarbonyl) - 5,6-cyclo-O-(carbonyl) hexitol, as a white crystalline powder, M.P. 166.5–168.0° C.

Analysis.—Calcd. for $C_{34}H_{38}O_9$: C, 69.14; H, 6.48; saponification value, 570. Found: C, 69.0; H, 6.4; saponification value, 540.

In general, the various active compounds encompassed by the generic structural formula herein given are solids that are very sparingly soluble in water. Typically, the water solubilities of the active compounds are in the range of 0.5 to 15 milligrams per 100 grams of cold water, or from 5 to 150 p.p.m. and of 1.5 to 50 milligrams per 100 grams of boiling water, or from 15 to 500 p.p.m. Consequently, in order to bring the active compound if used in a dry state into effective contact or association with the seed, root or plant to be treated, the active compound should be of a particle size between 100 and 400 mesh, or even finer, and preferably admixed with a solid wettable-type carrier, also in finely divided discrete form, that has the property of causing the resulting dry admixture to adhere to the seed coat. Where the active compound is to be sold and/or used in a water-dispersed form, a dispersant is admixed with the active compound, or both a dispersant and a carrier, either water-soluble or water-insoluble, are used to effect best results.

The term "dispersant" as herein used means a substance which promotes the formation of a colloidal solution or suspension of the active compound in a liquid medium, particularly water. In this broad sense the term is generic to wetting and emulsifying agents that assist in the formation of a colloidal solution or suspension of the active compound used in the treatment of seeds in accordance with the invention.

The term "carrier" means any normally solid substance, preferably a very finely powdered natural or synthetic siliceous or argillaceous substance, of a hydrated structure and easily wettable. Various talcs and clays come under this category, but those that have the specific property of causing the active chemical to adhere to the seed coat should be selected for the purpose.

Examples of suitable dispersants are the following:

Alkali metal (principally sodium) lignosulfates, such as those available under the proprietary names: Marasperse N and Lignosol XD;
alkali metal (principally sodium) sulfonates of aryl and alkaryl compounds, such as sodium alkylnaphthalene sulfonates available under the proprietary name Nekal BX-78; and
sodium sulfonaphthalene-urea condensates, such as those available under the proprietary name of Blancol.

Examples of dispersants that have pronounced wetting and emulsifying properties and therefore may be considered primarily as wetting agents or emulsifying agents, or both, are the following:

polyalkoxy or mixed alkoxy ($C_2$ and $C_3$ alkoxy radicals) condensates, such as the liquid condensates of which Pluronic L-61 is typical; and the solid condensates of which Pluronic F-68 is typical;
polyethylene glycol fatty esters, such as Alrodyne 304 and Atlox; and
alkaryl sulfonates, such as the sodium alkylbenzene sulfonates, of which Daxad No. 27 is an example;
fatty alcohol polyglycol ethers, such as Emulgin 05 or 010; and
alkylphenoxy poly (ethyleneoxy) ethanols, such as Igepal DJ-970 and Triton X-100.

Examples of suitable carriers are the following:

synthetic precipitated hydrated silicon dioxide, such as Hi-Sil 232;
hydrated aluminum silicates, such as a pyrophillite, available by the proprietary names of Clatal No. 2952, Pyrox ABB, and Air Float No. 1;
agricultural talcs such as Asbestol Superfine, Micro Velva A, and Emtco 23;
kaolinite clays, such as Continental Clay, Tamfloss Clay No. 2p and Suprex LC; and
precipitated hydrated sodium and calcium silicoaluminates, such as the zeolites, of which Zeolex-7-A is an example.

The following are examples of various types of formulations of the active compounds for the purposes indicated, percentages being by weight:

(1) Emulsion concentrates for shipment and subsequent dilution for use in the treatment of seeds, roots and plants—

| | Percent |
|---|---|
| Active compound | 1-50 |
| Dispersant, such as Triton X-100 or Emulgin 05 | 1-10 |
| Aqueous type solvent | 10-50 |

The aqueous type solvent is suitably a water solution of a low molecular weight (i.e., $C_1$-$C_6$) ketone, alcohol or glycol or mixtures thereof. Such a concentrate is diluted with water to form a suspension, or colloidal dispersion, of the active compound, containing from 1,000 to 10,000 p.p.m., typically 2,000 p.p.m. of the active compound, for ultimate use in the treatment of seeds, roots or plants.

(2) Soluble wettable powders for application as such, or for use upon further dilution

| | Percent |
|---|---|
| Active compound | 1-75 |
| Carrier, viz, Hi-Sil 232 or Zeolex-7-A | 1-5 |
| Dispersant, such as 1-5% Pluronic and 1-5% Lignosol XD, Blancol or Nekal Bx-78 | 2-10 |
| Soluble diluent such as a powdered sugar or soluble starch | 20-95 |

(3) Insoluble wettable powders for use as such, or for use upon further dilution

| | Percent |
|---|---|
| Active compound | 1-75 |
| Carrier, as in 2 above | 1-5 |
| Dispersant, as in 2 above | 2-10 |
| Insoluble carrier, such as a pyrophyllite, talc or clay | 20-95 |

(4) Dusts for application as such to seeds, roots or plants to adhere thereto as dry but wettable dusts

| | Percent |
|---|---|
| Active compound | 1-75 |
| Insoluble carrier as in 3 above | 25-99 |

*Seed treatment using a wettable powder as dust*

The active chemical was first incorporated into a wettable powder concentrate containing 50% by weight of the active chemical, and having typically the following formula by weight:

| | Percent |
|---|---|
| Active compound | 50 |
| Pre-mix | 50 |

| | |
|---|---|
| Finely powdered $SiO_2$ | 92 |
| Sodium lignosulfate | 4 |
| Liquid ethylene ovide | 0 |
| Propylene oxide condensate | 4 |

The 50% concentrate was then diluted with a suitable clay, such as Continental Clay, a product of the R. T. Vanderbilt Company, having excellent adherence properties toward seeds, to the following dosage levels: 4%, 2%, 1% and ½% of the active chemical by weight of the admixture.

Seed treatment consisted in admixing with the desired seed a slight excess of the composition at each of the various dosage levels. Prior to planting, the treated seeds were lightly sifted to remove any excess of the treating composition not taken up by the seed coat. This means that while the dosage levels were held constant at the respective percentage levels in the mixing of the treating composition and the seeds, the actual amount of the composition remaining adhered to the seeds after the light sifting operation would vary with the particular seed, due to the size of seed (surface area in proportion to mass), nature of the seed coat and its ability to retain dusts or powders.

The treated seeds were then planted in a soil of a regular potting type. In the preliminary tests, four replicates were always used for each dosage of a particular compound and the observed data were averaged and compared with a planting of the same but untreated seeds, as checks.

*Seed treatment using an aqueous type dispersion*

In this procedure, the active chemical is dispersed in an aqueous type medium as a collodial solution or suspension. This was done by dispersing the just-described wettable powder in water, or by diluting an emulsion concentrate, such as that described above, to dosage levels of 4,000, 2,000 and 1,000 p.p.m. of the active compound. These respective solutions or suspensions were then distributed in 5 cc. quantities onto discs of filter paper, contained within plastic petri dishes. Twenty five seeds of the respective selected crops were then placed on each of the treated filter discs; the dishes covered; held at 75° F. for the duration of test and observed for germination on the 5th, 7th and 12th day after planting.

As a reslult of these two types of test procedures, the active compounds herein specified were found to stimulate seed germination and/or root and/or plant growth in the case of the following agricultural crop seeds:

| | |
|---|---|
| cucumber | wheat |
| barley | beets (table) |
| buckwheat | hybrid grain sorghum |
| flax | cotton |
| sweet corn | soy beans |
| hybrid corn | blue grass |
| rye grass | peppers |
| timothy grass | sugar beets |
| tomato | alfalfa |

In most cases, the treatment with an active compound resulted in a marked increase in acceleration of emergence.

Particular active compounds have greater effectiveness for one crop seed than another. In the case of corn, for instance, the increase in acceleration of emergence was most pronounced when a ½% dust dosage containing the 1,1,2 - tris(4 - methylphenyl) - 1,2, - dideoxy hexitol prepared from D-fructose was applied.

The 1,1,2 - tris(4 - methylphenyl) - 1,2 - dideoxy-3,4,5,6-tetra-O-acetyl hexitol derived from the fructose-toluene condensate showed marked effect in stimulating the growth of roots and cotyledons.

At the 4,000 p.p.m. dosage level, the D-fructose derived 1,1,2 - tris - (4 - methylphenyl) - 1,2 - dideoxy hexitol exhibited a very pronounced stimulation of the root growth of cucumbers on the 5th and 7th day in that the roots were not only two to three times as long as the check seedlings, but also the root system seemed to be more vigorous and the roots were definitely thicker than the untreated seedlings.

In the case of sweet corn, all of the specific active compounds, when applied as dust at a ½% dosage level, showed marked increase in acceleration of emergence. This is highly significant, since corn is such a widely grown crop.

The tetramethoxy derivative of the fructose-toluene condensate, such as the 1,1,2 - tris(4-methylphenyl)-1,2-dideoxy - 3,4,5,6 - tetra-O-methyl hexitol, (Species No. 7 above), exhibits a high degree of stimulatory activity on sugar beets and soy beans, while the fructose-O-condenate, (Species No. 1 above), and the fructose-O-xylene condensate, (Species No. 3 above), exhibit pronounced regulatory activity on hybrid corn and sorghum.

Maximum germination response of certain types of hybrid seed corn is obtained when a fungicide is used in conjunction with the active stimulator compounds. Any of the conventional fungicides, plant hormones, elemental nutrients and seed disinfectants can be used in conjunction with our stimulator compounds to advantage to obtain the beneficial effects of the multiple treatments; and, in some instances, to obtain greater stimulatory effects than can be obtained by the use of the active stimulator compounds by themselves.

The active compounds herein specifically named were found to have little or no phytocidal effect.

Those skilled in the art will recognize that the use of the specified stimulator formulations in conjunction with or in addition to known seed treatment chemicals, such as fungicides, to obtain the beneficial effects of both treatments, would be a logical extension and within the scope of the present invention.

What is claimed is:

1. A composition for stimulating plant seed germination and plant growth comprising as the active compound present therein in an effective proportion a member of the class having the structural formula

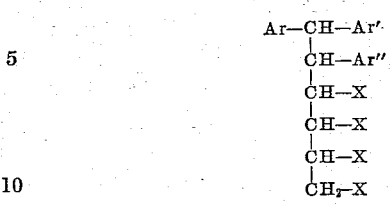

wherein Ar is a member of the group consisting of phenyl, alkyl phenyl, hydroxy phenyl and alkyl hydroxy phenyl radicals; Ar' and Ar'' are members of the group consisting of phenyl, alkyl phenyl, hydroxy phenyl, alkyl hydroxy phenyl, cyclohexyl, alkyl cyclohexyl, hydroxy cyclohexyl and alkyl hydroxy cyclohexyl radicals; X is a member of the group consisting of OH, —OOCR, —OCOOR', —OCONR$_2$ and at least one hydrocarbon ether radical, the hydrocarbon being a member of the group consisting of alkyl and aryl radicals having 1 to 10 carbon atoms; R is a member of the group consisting of hydrogen, alkyl and aryl radicals having 1 to 10 carbon atoms; R' is a member of the group consisting of alkyl and aryl radicals having 1 to 10 carbon atoms; and a phytologically acceptable carrier substance selected from the group consisting of water wettable solid powders in dry form containing a surface active substance, dry plant and seed cohesive dusts containing a surface active agent, and emulsion concentrates containing a solid surface active agent and an aqueous solvent, adapting said composition for the treatment of seeds, roots and plants.

2. A composition as defined by claim 1 in which the active compound is a 1,1,2-tris(4-methylphenyl) - 1,2-dideoxy hexitol.

3. A composition as defined by claim 1 in which the active compound is a 1,1,2-tris(4-methylphenyl) - 1,2-dideoxy-3,4,5,6-tetra-O-acetyl hexitol.

4. A composition as defined by claim 1 in which the active compound is 1,1,2-tris(3,4-dimethylphenyl) - 1,2-dideoxy-D-fructo-hexitol.

5. A composition as defined by claim 1 in which the active compound is 1,1,2-tris(3,4-dimethylphenyl) - 1,2-dideoxy-L-sorbo-hexitol.

6. A composition as defined by claim 1 in which the active compound is a 1,1,2-tris(3,4-dimethylphenyl) - 1,2-dideoxy-3,4,5,6-tetra-O-acetyl hexitol.

7. A composition as defined by claim 1 in which the active compound is a 1,1,2-tris(4-methylphenyl) - 1,2-dideoxy-3,4,5,6-tetra-O-methyl hexitol.

8. A composition as defined by claim 1 in which the active compound is a 1,1-bis(4-methylphenyl)-2-(3,4-dimethylphenyl)-1,2-dideoxy hexitol.

9. A composition as defined by claim 1 in which the active compound is a 1,2-bis(4-methylphenyl)-1 - (4-methylcyclohexyl)-1,2-dideoxy hexitol.

10. A composition as defined by claim 1 in which the active compound is a 1,1-bis(4-ethylphenyl)-2-(3,4-dimethylphenyl)-1,2-dideoxy-3,4,5,6-tetra-O-acetyl hexitol.

11. A composition as defined by claim 1 in which the active compound is a 1,1,2-tris(3,4-dimethylphenyl)-1,2-dideoxy-3,4:5,6-di-O-isopropylidine hexitol.

12. A composition as defined by claim 1 in which the active compound is a 1,1,2-tris(4-methylphenyl) - 1,2-dideoxy-3,4:5,6-di-O-benzylidene hexitol.

13. A composition as defined by claim 1 in which the active compound is a 1,1,2-tris(3,4-dimethylphenyl)-1,2-dideoxy-3,4,5,6-tetra-O-methyl hexitol.

14. A composition as defined by claim 1 in which the active compound is a 1,1,2-tris(3,4-dimethylphenyl) - 1,2-dideoxy-3,4,5,6-tetra-O-(phenylcarbamoyl) hexitol.

15. A composition as defined by claim 1 in which the active compound is a 1,1,2-tris(4-methylphenyl)-1,2-dideoxy-5,6-di-O-methyl hexitol.

16. A composition as defined by claim 1 in which the active compound is a 1,1,2-tris(4-methylphenyl) - 1,2-dideoxy-3,4-bis-O-(ethoxycarbonyl)-5,6-cyclo - O - (carbonyl) hexitol.

17. A composition as defined by claim 1 in which the active compound is a 1,1,2-tri-phenyl-1,2-dideoxy hexitol.

18. A composition as defined by claim 1 in which the active compound is a 1,1,2-tris(4 - ethylphenyl) - 1,2-dideoxy hexitol.

19. A method for stimulating the germination of plant seeds, and the growth of roots and plants, which comprises treating the same with an effective amount of a compound having the structural formula

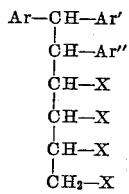

wherein Ar is a member of the group consisting of phenyl, alkyl phenyl, hydroxy phenyl and alkyl hydroxy phenyl radicals; Ar' and Ar" are members of the group consisting of phenyl, alkyl phenyl, hydroxy phenyl, alkyl hydroxy phenyl, cyclohexyl, alkyl cyclohexyl, hydroxy cyclohexyl and alkyl hydroxy cyclohexyl radicals; X is a member of the group consisting of OH, —OOCR, —OCOOR', —OCONR$_2$ and at least one hydrocarbon ether radical, the hydrocarbon being a member of the group consisting of alkyl and aryl radicals having 1 to 10 carbon atoms; R is a member of the group consisting of hydrogen, alkyl and aryl radicals having 1 to 10 carbon atoms; R' is a member of the group consisting of alkyl and aryl radicals having 1 to 10 carbon atoms.

20. The method of claim 19 wherein the compound is contained in a phytologically acceptable carrier substance selected from the group consisting of water wettable solid powders in dry form containing a surface active substance, dry plant and seed cohesive dusts containing a surface active agent, and emulsion concentrates containing a solid surface active agent and an aqueous solvent, adapting said composition for the treatment of seeds, roots and plants.

References Cited
UNITED STATES PATENTS 2,798,099 7/1957 Linn _____ 260—618
2,798,100 7/1957 Linn _____ 260—618

LEWIS GOTTS, *Primary Examiner.*

JAMES O. THOMAS, JR., *Assistant Examiner.*

UNITED STATES PATENT OFFICE
CERTIFICATE OF CORRECTION

Patent No. 3,331,678                                July 18, 1967

Cecil C. Chappelow, Jr., et al.

It is hereby certified that error appears in the above numbered patent requiring correction and that the said Letters Patent should read as corrected below.

In the heading to the printed specification, line 3, for "PLANT GROWTHS" read -- PLANT GROWTH --; column 2, line 56, for "I" read -- II --.

Signed and sealed this 23rd day of July 1968.

(SEAL)
Attest:

Edward M. Fletcher, Jr.                              EDWARD J. BRENNER
Attesting Officer                                         Commissioner of Patents